(12) United States Patent
Mestha (10) Patent No.: US 7,773,222 B2
(45) Date of Patent: Aug. 10, 2010

(54) UV ENHANCED FULL WIDTH ARRAY SCANNING SPECTROPHOTOMETER

(75) Inventor: Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 161 days.

(21) Appl. No.: 12/194,602

(22) Filed: Aug. 20, 2008

(65) Prior Publication Data
US 2009/0296085 A1    Dec. 3, 2009

Related U.S. Application Data

(60) Provisional application No. 61/056,102, filed on May 27, 2008.

(51) Int. Cl.
G01J 3/50 (2006.01)
(52) U.S. Cl. .................... 356/407; 356/420
(58) Field of Classification Search ................ 356/319, 356/402, 407, 425
See application file for complete search history.

(56) References Cited

U.S. PATENT DOCUMENTS

| | | | |
|---|---|---|---|
| 5,963,244 A | 10/1999 | Mestha et al. | |
| 6,249,346 B1 | 6/2001 | Chen et al. | |
| 6,295,130 B1 | 9/2001 | Sun et al. | |
| 6,556,932 B1 | 4/2003 | Mestha et al. | |
| 6,584,435 B2 | 6/2003 | Mestha et al. | |
| 6,587,793 B2 | 7/2003 | Viassolo et al. | |
| 6,621,576 B2 | 9/2003 | Tandon et al. | |
| 6,690,471 B2 | 2/2004 | Tandon et al. | |
| 6,721,692 B2 | 4/2004 | Mestha et al. | |
| 6,975,949 B2 | 12/2005 | Mestha et al. | |
| 7,259,853 B2 | 8/2007 | Hubble, III et al. | |
| 7,271,910 B2 | 9/2007 | Paul et al. | |
| 7,277,196 B2 | 10/2007 | Van de Capelle et al. | |
| 7,333,208 B2 | 2/2008 | Mestha et al. | |
| 7,684,082 B2 * | 3/2010 | Mestha et al. | 358/1.9 |
| 2003/0055611 A1 | 3/2003 | Mestha et al. | |
| 2005/0240366 A1 | 10/2005 | Mestha et al. | |
| 2006/0132777 A1 | 6/2006 | Hubble, III et al. | |
| 2006/0132787 A1 | 6/2006 | Mestha et al. | |
| 2006/0152718 A1 | 7/2006 | Mestha et al. | |
| 2007/0139734 A1 | 6/2007 | Fan et al. | |
| 2008/0037069 A1 | 2/2008 | Mestha et al. | |
| 2008/0080027 A1 | 4/2008 | Mestha et al. | |
| 2009/0185230 A1 * | 7/2009 | Mestha et al. | 358/3.23 |
| 2009/0296091 A1 | 12/2009 | Skinner et al. | |
| 2009/0296107 A1 * | 12/2009 | Mestha et al. | 358/1.9 |
| 2009/0296108 A1 * | 12/2009 | Gil et al. | 358/1.9 |
| 2009/0296110 A1 | 12/2009 | Mestha et al. | |
| 2009/0299905 A1 * | 12/2009 | Mestha et al. | 705/76 |

* cited by examiner

Primary Examiner—F. L Evans
(74) Attorney, Agent, or Firm—Fay Sharpe LLP (57) ABSTRACT

A system and method for full width scanning color analysis of a printed media sheet are disclosed. The full width array spectrophotometer system includes one or more substantially linear elongated illumination arrays of closely spaced multiple illumination sources. The sources include sets of illumination sources, including a first set of different color illumination sources and a second set including one or more UV-emitting illumination sources. The sets are arranged to span a printer paper path or other object path to illuminate a band extending transversely across a printed print media sheet or other object moving in the path. A full width array light imaging sensor includes an elongated array of multiple closely spaced photodetectors for detecting plural colors and is positioned adjacent to and extending substantially parallel to the linear array(s) to receive radiation reflected from the transverse illuminated band.

23 Claims, 3 Drawing Sheets

UV ENHANCED FULL WIDTH ARRAY SCANNING SPECTROPHOTOMETER

This application claims the priority of U.S. Provisional Application Ser. No. 61/056,102, filed May 27, 2008, the disclosure of which is incorporated herein in its entirety by reference.

CROSS REFERENCE TO RELATED PATENTS AND APPLICATIONS

The following copending applications, the disclosures of which are incorporated in their entireties by reference, are mentioned:

U.S. patent application Ser. No. 12/017,746, filed Jan. 22, 2008, entitled METHOD AND APPARATUS FOR OPTIMUM BLACK COMPONENT DETERMINATION FOR GRAY COMPONENT REPLACEMENT, by Mestha, et al.;

U.S. patent application Ser. No. 12/127,643, filed May 27, 2008, entitled METHOD, APPARATUS AND SYSTEMS TO RETRIEVE GCRS FROM HISTORICAL DATABASE, by Mestha, et al.;

U.S. Patent Application Ser. No. 61/056,189, filed May 27, 2008, entitled IMAGE INDEXED RENDERING OF IMAGES FOR TUNING IMAGES FROM SINGLE OR MULTIPLE PRINT ENGINES, by Mestha, et al.;

U.S. Patent Application Ser. No. 61/056,095, filed May 27, 2008, entitled METHOD TO MINIMIZE INSTRUMENT DIFFERENCES IN COLOR MANAGEMENT FUNCTIONS, by Bonino, et al.;

U.S. Patent Application Ser. No. 61/056,090, filed May 27, 2008, entitled METHOD FOR CONDITIONAL APPLICATION OF COLOR MEASUREMENT ERROR COMPENSATION IN SPECTRAL SENSORS, by Skinner, et al.;

U.S. patent application Ser. No. 12/127,719, filed May 27, 2008, entitled COOPERATIVE NEIGHBOR PRINTING SYSTEM PROFILE METHODS AND SYSTEMS, by Gil, et al.; and U.S. patent application Ser. No. 12/127,649, filed May 27, 2008, entitled A WEB ENABLED COLOR MANAGEMENT SERVICE AND METHOD, by Mestha, et al.

U.S. patent application Ser. No. 11/737,576, filed Apr. 19, 2007, entitled METHOD AND SYSTEM FOR COMPENSATING FOR THERMOCHROMATICITY DIFFERENCES IN INLINE SPECTROPHOTOMETERS, by Mestha, et al.

BACKGROUND

The exemplary embodiment relates to spectrophotometer scanning systems that are suitable for high speed online document color analysis, and finds particular application in connection with the comparison of documents output on different print media.

Spectroscopy involves the measurement and analysis of electromagnetic radiation absorbed, scattered, or emitted by atoms, molecules, or other chemical or physical materials. Each object affects light in its own unique way. When light waves and other incident electromagnetic radiation strike an object, the object's surface absorbs some of the spectrum's energy, while other parts of the spectrum are reflected back from the object. The modified light that is reflected from the object has an entirely new composition of wavelengths. Different surfaces containing various pigments, dyes, and inks (or other chemicals) generate different but unique wavelength compositions. Light can be modified by striking a reflective object such as paper or by passing through a transmissive object such as film or a transparency. The pattern of wavelengths that leaves an object is the object's spectral data, which is often called the "finger print" of the object. Measuring spectral content of the object can give its intrinsic properties. For example, the region of the electromagnetic spectrum visible to the human eye ranges from about 400 nm to 700 nm, and if spectral measurements can be made in that wavelength range, then one can determine the color of the object. The amount of reflectance intensity decomposed at each wavelength is the most complete and accurate description of the color that a person can see. Hence in this case, the spectrophotometer becomes a true color sensor.

Spectrophotometers with a broad range of spectral synthesis have a wide range of applications, including color printing, color measurements in displays, paints, textiles, electronic cameras, chemical analysis, environmental monitoring, measurement of bio-samples for medicine or personal identification, and the like. Commercial spectrophotometers tend to be large in size with many optical elements.

Commercial document scanners commonly sense colors in terms of RGB coordinates, which approximate the human visual system. Most scanners deviate from the human visual system in ways that differ depending on the media and ink being scanned. To address this problem, different characterizations, or profiles can be built for different media. Creation of profiles for multiple media and image combinations can result in a loss of productivity. To address this problem, a wide area scanning spectrophotometer may be embedded in each printing device. For example, full width array (FWA) spectrophotometer systems have been developed which include an array of light sources, such as LEDs, of different colors in the visible range, which are arranged in a multiply repeating pattern. Such systems utilize a linear array of photodetectors to detect an illuminated band of a test target. Measurements obtained on such a device can be used to correct for differences in print media.

A problem with such devices is that they do not always generate measurements which correspond to humanly perceived colors under different types of illumination, such as natural light, fluorescent light, and incandescent light.

INCORPORATION BY REFERENCE

The following references, the disclosures of which are incorporated herein in their entireties by reference, are mentioned:

U.S. Pat. No. 6,975,949, entitled FULL WIDTH ARRAY SCANNING SPECTROPHOTOMETER, by Mestha, et al., discloses a full width array spectrophotometer for full width scanning color analysis of a printed print media sheet. The spectrophotometer includes linear arrays of LEDS in a repeating pattern to span the paper path and a corresponding parallel array of photodetectors to receive light reflected from a transverse illuminated band extending transversely across a print media sheet moving in the paper path.

U.S. Pat. No. 7,333,208, entitled FULL WIDTH ARRAY MECHANICALLY TUNABLE SPECTROPHOTOMETER, discloses a method of full transverse scanning color analysis of color printed sheets moving in a color printer path with a full width array spectrophotometer.

U.S. Pat. No. 7,271,910, entitled SYSTEMS AND METHODS FOR COMPENSATING FOR TEMPERATURE INDUCED SPECTRAL EMISSION VARIATIONS IN LED BASED COLOR PARAMETER MEASURING DEVICES, discloses a method of determining color parameter values for sensors using a reference database containing different model information for different temperatures. The method includes determining an appropriate model for the operating temperature and the outputs of the sensor and determining color parameter values based on the determined model.

U.S. Pat. No. 7,259,853, entitled SYSTEMS AND METHODS FOR AUGMENTING SPECTRAL RANGE OF AN LED SPECTROPHOTOMETER, by F. F. Hubble III, et al., discloses an LED spectrophotometer device for determining an aspect of the color of an object. The device includes a visible spectrophotometer comprising a plurality of light emitting diodes that emit light in the visible spectrum onto the object. At least one detector detects the light after being directed onto the object and for generating an output. A UV light emitting diode assembly emits light in the near ultraviolet spectrum and communicates with at least one detector for generating an output. A mechanism blocks light outside of a preselected visible blue spectral range from being detected by the detector of the UV light emitting diode assembly.

U.S. Pub. No. 2006/0152718, entitled SYSTEMS AND METHODS FOR SELECTING A REFERENCE DATABASE FOR DETERMINING A SPECTRUM OF AN OBJECT BASED ON FLUORESCENCE OF THE OBJECT, by L. K. Mestha, et al., discloses a method of determining a reflectance spectrum, which includes predicting a degree of fluorescence of an object prior to determining a reflectance spectrum of the object. The method includes selecting a most appropriate reference database from among a plurality of reference databases based on the predicted degree of fluorescence of the object, each of the reflectance databases indicating a reflectance spectra of a set of reference colors and corresponding sensor outputs, determining a reflectance spectrum of the object using the most appropriate database, and using the determined reflectance spectrum to determine the output of a coloring device.

U.S. Pat. No. 6,295,130, entitled STRUCTURE AND METHOD FOR A MICROELECTROMECHANICALLY TUNABLE FABRY-PEROT CAVITY SPECTROPHOTOMETER, by Sun, et al., discloses a measurement system for spot measurements requiring a single peak, which is generally difficult to achieve in Fabry-Perot devices.

U.S. Pat. No. 6,249,346, entitled MONOLITHIC SPECTROPHOTOMETER, by Chen, et al., discloses a spectrophotometer which includes a monolithic substrate. A grating disperses input optical waves defined in the monolithic substrate. A photodiode array is movable to a position to receive dispersed optical waves from the grating. Signal processing circuitry is formed on the monolithic substrate and connected to the photodiode array.

U.S. Pub. No. 2006/0132777, entitled SYSTEMS AND METHODS FOR SELECTING A REFERENCE DATABASE FOR DETERMINING A SPECTRUM OF AN OBJECT BASED ON FLUORESCENCE, discloses a method and apparatus for determining a reflectance spectrum which includes predicting the degree of fluorescence of an object, selecting an appropriate database, and determining a reflectance spectrum using the database. The method disclosed allows the range of LC LED spot color sensors to be extended by using UV LEDs in a fluorescence illuminator package beside a main spectrophotometer assembly. The illuminator package is not suitable for full width array architecture.

U.S. Pub. No. 2006/0152718 covers the low cost methods for selecting various reference databases for constructing a spectrum accurately of an object with a priori knowledge of the fluorescence. We wrote this ID to extend the body of intellectual property to the particular case of multiple illuminant full width array scanning spectrophotometer assembly described in Reference 1. Since we have generated and captured a large body of patent literature around low cost color sensing on a moving substrate, we did not want to leave the abilities to enhance the measurements to UV range.

BRIEF DESCRIPTION

In accordance with one aspect of the exemplary embodiment, a full width array spectrophotometer system for full width scanning color analysis of a printed media sheet is provided. The system includes an elongated illumination array of closely spaced illumination sources, including a first set of illumination sources of different colors in the visible range, and a second set of UV-emitting illumination sources comprising at least one UV-emitting illumination source. The sets are arranged so as to extend sufficiently in the substantially linear dimension to transversely substantially span a printer paper path to illuminate, with the illumination sources of different colors in the visible range and the UV-emitting illumination source, a transverse illuminated band extending transversely across a printed print media sheet moving in the paper path. A full width array radiation sensor comprising an elongated array of multiple closely spaced photodetectors for detecting plural colors adjacent to and extending substantially parallel to the at least one substantially linear array of closely spaced multiple illumination sources. The full width array radiation sensor is positioned to receive radiation reflected from the transverse illuminated band extending transversely across the print media sheet moving in the paper path.

In accordance with another aspect of the exemplary embodiment, a method for full width scanning color analysis of a printed media sheet, includes illuminating a printed media sheet with a plurality of illumination sources arranged in at least one substantially linear elongated illumination array of closely spaced multiple illumination sources, the array of comprising a first set of illumination sources of different colors in the visible range and a second set of UV-emitting illumination sources comprising at least one UV-emitting illumination source, the sets arranged so as to extend sufficiently in the substantially linear dimension to transversely substantially span a printer paper path to illuminate, with the illumination sources of different colors in the visible range and the UV-emitting illumination source, a transverse illuminated band extending transversely across a printed print media sheet moving in the paper path. Reflected electromagnetic radiation is measured with a full width array sensor comprising an elongated array of multiple closely spaced photodetectors for detecting plural colors adjacent to and extending substantially parallel to the at least one substantially linear array of closely spaced multiple illumination sources, the light imaging sensor being positioned to receive radiation reflected from the transverse illuminated band extending transversely across the print media sheet moving in the paper path.

In another aspect, a combination comprising an output device and a full width array spectrophotometer is provided. An output device stores information for generating a printed media sheet comprising rows of different color test patches and at least one space absent test patches. A full width array spectrophotometer includes an elongated array of illumination sources positioned to illuminate the generated sheet including a plurality of first illumination sources, each first illumination source having a peak emission wavelength in a visible region of the electromagnetic spectrum, and at least one second illumination source, each second illumination source having a peak emission wavelength outside the visible portion of the electromagnetic spectrum, at least one of the at least one second illumination sources being positioned to illuminate the at least one space. A light imaging sensor including an elongated array of multiple closely spaced photodetectors for detecting plural colors, adjacent to and extending substantially parallel to the array of illumination sources, is positioned to receive light reflected from the printed media sheet, including light reflected from the at least one space illuminated by the at least one second illumination source.

In accordance with another aspect of the exemplary embodiment, a full width array spectrophotometer system for full width scanning color analysis of an object is provided. The system includes at least one substantially linear elongated illumination array of closely spaced multiple illumination sources, the illumination sources comprising a plurality of sets of illumination sources, each set comprising a plurality of illumination sources of different colors in the visible range and at least one illumination source having a peak wavelength outside the visible range, arranged so as to extend sufficiently in the substantially linear dimension to transversely substantially span a path of an object moved relative to the array, to sequentially illuminate, with the illumination sources of different colors in the visible range and the least one illumination source having a peak wavelength outside the visible range, a transverse illuminated band extending transversely across an object moving relative to the array in the path. The system further includes a full width array sensor comprising an elongated array of multiple closely spaced photodetectors for detecting plural colors adjacent to and extending substantially parallel to the at least one substantially linear array of closely spaced multiple illumination sources, the full width array sensor being positioned to receive radiation reflected from the transverse illuminated band extending transversely across the object moving in the path.

DETAILED DESCRIPTION

Aspects of the exemplary embodiment relate to a full width array spectrophotometer for full width scanning color analysis of a printed print media sheet. The spectrophotometer includes illumination sources which may be arranged as one or more substantially linear elongated illumination arrays of closely spaced multiple illumination sources, such as LEDs (light emitting diodes and/or laser diodes) of plural different color emissions. The LEDs may be arranged to repeat the at least four different colors several times over the length of the array, e.g., in a repeat pattern. The array extends sufficiently in the substantially linear dimension to transversely substantially span a printer paper path to sequentially illuminate, with the plural color emissions, a band extending generally transversely across a printed print media sheet moving in the paper path. The media sheet can be formed of paper, plastic, cloth, metal, semiconductor materials, combinations thereof, or other material suited to printing.

The spectrophotometer also includes a full width array sensor, such as a full width array light imaging bar, comprising an elongated array of multiple closely spaced color photodetectors adjacent to and extending substantially parallel to the substantially linear array of closely spaced multiple LED illumination sources. The light imaging bar is positioned to receive light (and any other reflected radiation) reflected from the illuminated band extending transversely across the print media sheet moving in the paper path. The spectrophotometer may be an in situ spectrometer, i.e., embedded in the output path of a color output device, such as a printer, to measure printed colors shortly after printing.

Although the human eye only detects colors in the visible range, such as from about 400-700 nm, it has been found that the human eye can perceive colors differently when printed sheets are illuminated with radiation that includes a UV component (i.e., includes radiation in the 200-400 nm range). It is suggested that the UV light interacts with the print medium and/or colorants, such as toners, on the sheet such that at least a portion of the incident UV radiation is reflected from the sheet as light in the visible range. Different print media and colorants may respond differently to the UV light. Thus, for example, the same colorants printed on two different types of print media may be perceived differently when viewed under the same illumination containing even a relatively small UV component. The exemplary spectrophotometer allows such differences to be accounted for by incorporating, into the illumination array, at least one, and in some embodiments, a plurality of illumination sources which emit radiation outside the visible range of the spectrum. In one embodiment, the illumination sources include UV emitting light sources, such as LEDs (e.g. light emitting diodes, laser diodes, or organic light emitting devices), which emit radiation in one or more UV spectral ranges. These illumination sources may each have a peak wavelength which is outside the visible range. The light imaging bar may be constructed so as to detect only the visible component of the reflected radiation (i.e., only visible light), and thus may comprise an elongated array of multiple closely spaced color photodetectors for detecting light in the visible range and not outside the visible range the UV range.

The exemplary spectrophotometer has the ability to measure colors at high printer speeds, at high resolution and with improved accuracy. A full width array optical sensing system, applicable for in situ measurements may provide significant advantages for automating publishing, production and decision processes in document production system via feedback through the proofing, prepress and creation stages. Such an optical sensor system may also have the capability for useful applicability for non-printing related applications, where materials or items can be identified through their color spectra.

The exemplary spectrophotometer system is particularly suitable for high speed online document color analysis. While the exemplary embodiment is described with particular reference to analysis of colors on print media, it also finds application in connection with the analysis of other objects moving relative to the spectrometer system on an object path, such as a piece of cloth or metal.

For example, the spectrophotometer system is also applicable to item identification and characterization in many non-graphic arts applications ranging from paint industry color measurements to biotechnology applications such as performing DNA profiling. It may also find application in the defining of wide range spectra (visible, UV, infrared) for a particular media using a selected set of measured samples set by a tunable optical filter.

The term "printer" or "color output device," as used herein broadly encompasses various printers, copiers, and multi-function machines or systems, xerographic or otherwise. The term "sheet" herein refers to a usually flimsy physical sheet of paper, plastic, cloth or other suitable physical substrate for images, whether precut or web fed. The term "illumination" and similar terms, as used herein encompass incident radiation which is outside the visible range of the electromagnetic spectrum. The term "color" refers to visible colors, i.e. which illuminate or generate reflectance values in the visible range of the spectrum.

Figure 1:
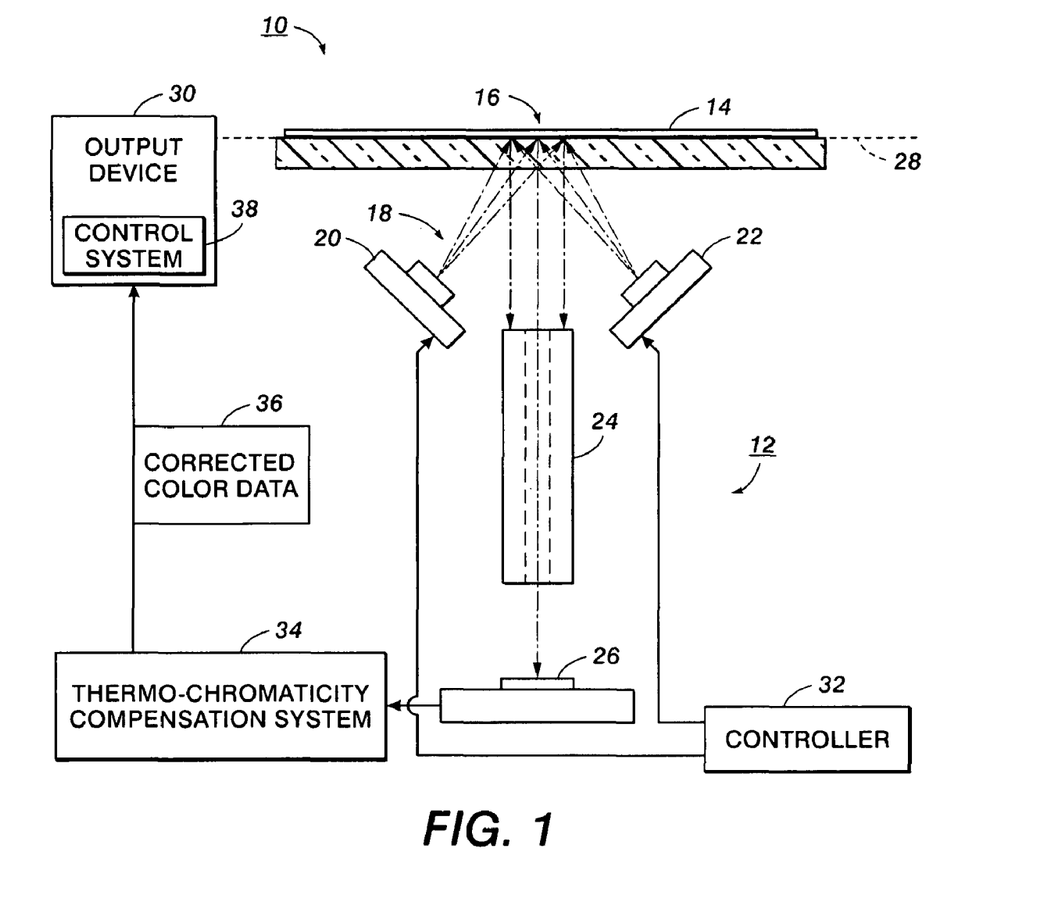
FIG. 1 is a schematic side view of one example of a full width scanning spectrophotometer system, shown scanning a printed sheet in the output path of a color output device, such as a xerographic printer or copier.

With reference to FIG. 1, a full width array scanning spectrophotometer system 10 is shown. The system includes a spectrophotometer 12 which obtains measurements (e.g., reflectances or voltage signals related thereto). A document 14 to be scanned is illuminated in an illumination band or strip 16 by a two-sided LED illuminator 18, having first and second full width LED arrays 20, 22 as will be further discussed below. A lens arrangement, such as a SELFOC lens 24 may be used to perpendicularly image the central area of the illuminated strip 16 onto a full width array (FWA) image sensor 26 comprising one or more rows of photodiodes, such as 3 or 4 rows. In one embodiment, the spectrophotometer 12 consisting of the illuminator 18, the lens 24 and the FWA image sensor 26 may remain stationary, with the document 14 moved relative to it using a constant velocity transport, such as is present in a normal paper output path 28 of an otherwise conventional color output device 30, e.g., a printer or copier, as illustrated in FIG. 1. In another embodiment, the document 14 may be stationary and the spectrophotometer moved at a constant velocity, as is the case in many platen document scanners.

As discussed in the above-mentioned U.S. Pat. Nos. 6,690,471 and 6,975,949, by sequentially activating a plurality (e.g. four or more) different output LEDs in the LED illuminator 18, eight or twelve different spectral measurements can be made using the 3 or 4 row image sensor arrays 26. These measurements can then be converted into the appropriate spectral or L*a*b* values using the algorithms of the above cited reference thereon, or others. This scanning spectrophotometer system 10 can thus provide higher quality color information compared to a simple RGB scanner due to the 8 to 12 measurements as opposed to only 3 measurements. Additionally, the FWA spectrometer system 10 can also be much faster than the prior spectrophotometers that provide only a single area, single test patch, reading point at a time measurement. In the exemplary embodiment, a controller 32 controls the sequential activation of the output LEDs.

Optionally, the output of the sensor 26 is fed to a thermochromaticity compensation system 34. The compensation system 34 compensates for differences in the temperature at which color samples are measured and an ambient temperature, at which the color samples are normally viewed and outputs corrected color data 36.

The measured reflectances may be used as a basis for assessing operability of a color output device which printed the color sample. For example, the corrected color data 36 may be input to an automatic color balance controller 38 for the printing system 30. The automatic color balance control system 38 produces multi-dimensional LUT (Look-Up Table) values for the CMYK primary colors by printing patches, measuring colors and automatically re-adjusting the LUTs until a satisfactory level of accuracy is obtained.

Figure 2:
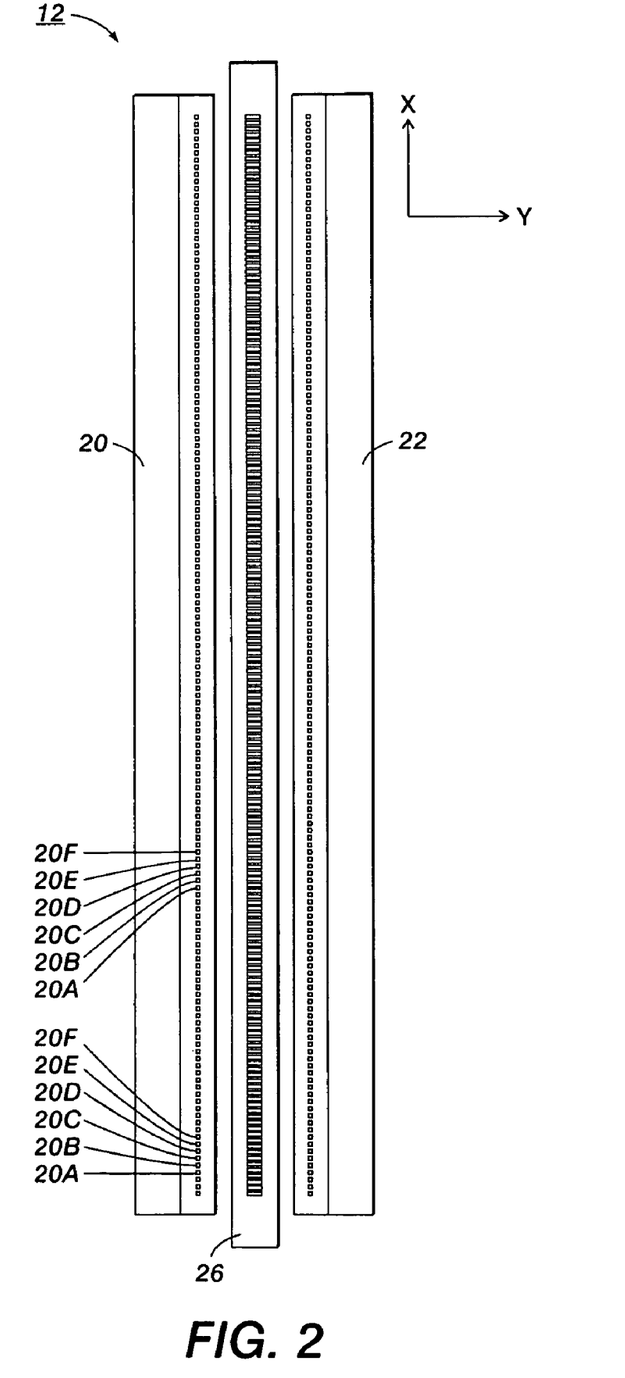
FIG. 2 is a top view of the scanning spectrophotometer of FIG. 1, without any printed sheet or other color test object present.

With reference now to FIG. 2, the illuminator 18 includes two linear LED arrays 20, 22, one on each side of the SELFOC lens 24 (not shown) and imaging bar 26, as shown. In other embodiments, a single linear LED array may be employed. Four or more different types of LEDs may be used in the LED array. In the view of FIG. 2, in illuminator linear array 20, a first set of four individual adjacent visible-emitting LEDs (or other illumination sources) 20A, 20B, 20C, 20D, and a second set comprising at least one UV-emitting LED 20E, is shown enlarged for illustrative clarity. The sets may be arranged as a sequential pattern of five LEDs, which may be repeated a plurality of times. Two or more of the LEDs 20A, 20B, 20C, 20D, 20E may have a peak emission wavelength spaced from each other by at least 50 nm. One or more of the LEDs (20E) in the pattern has a peak wavelength outside the visible range or which emits a substantial proportion, e.g., >30%, or >70% of its radiation outside the visible range (i.e., below 400 nm). LEDs 20A, 20B, 20C, 20D, could be, for example, LEDs having wavelengths of white (substantially all visible wavelengths) (20A), and peak wavelengths of 430 nm (20B), 505 nm (20C), and 595 nm (20D), respectively (i.e., all in the visible range). Other wavelengths in the visible range are also contemplated, optionally with fewer of more of the LEDs emitting in the visible range. LED 20E may be a UV-emitting LED emitting a substantial proportion of its radiation outside the visible range and may have a peak wavelength of about 200-410 nm, e.g., less than 400 nm such as about 390 nm or less and, in one embodiment, from 360 to 370 nm. Where more than one type of UV-emitting illumination source is provided, the two, or more UV illumination sources may differ in emission spectra and differ in their peak wavelength by, for example, at least about 50 nm. E.g., one UV-emitting LED may have an emission peak in the range of from 360 to 370 nm and another in the range of from 300-310 nm. Alternatively, one type of UV-emitting source emits over a broad wavelength range and another emits in a relatively narrow wavelength band.

In other embodiments, the one or more UV-emitting LED 20E does not form a part of a sequential pattern of LEDs and may be interspersed with or separate from the other LEDs in any suitable position(s) in the LED array.

In addition to, or in place of, the UV-emitting illumination source 20E, an illumination source 20F may be provided which has an emission spectrum that has a substantial portion in the infra-red (IR) range, such as a peak wavelength from about 700-2000 nm, e.g., at least 720 nm. In some embodiments, the UV-emitting and/or infrared-emitting illumination sources emit radiation outside a detection wavelength range of the array 26 of multiple closely spaced photodetectors. For example, the detectors may detect visible reflected light (400-700 nm) while the UV-emitting and/or infrared-emitting illumination sources may emit radiation which is predominantly outside this range.

In one embodiment, all LEDs of one kind (for example, all 20A LEDs or all 20E LEDs) may be turned on together so that their resultant transversely adjacent portions of image sensor array 26 capture multiple output signals substantially simultaneously. This process may be rapidly repeated as a fast scan with the next set of white, 430 nm, 505 nm, 595 nm, and 360-370 nm LEDs being illuminated next to illuminate the next lateral (transverse) portion of test strip 16 and being detected by the next corresponding set of 4 rows of 3 or 4 differently color filtered photodetectors along the FWA image sensor 26, and so on until the sequence is completed.

While in the exemplary embodiment, the LEDs are actuated sequentially, in one embodiment, the UV-emitting LED is actuated contemporaneously with at least one visible-emitting LED, e.g., at the same time as or at least partially overlapping the actuating time of one or more other LEDs. Thus for example, the following LEDs and combinations of LEDs may be actuated in any order: 20A, 20B, 20C, 20D, 20A+20E, 20B+20E, 20C+20E, 20D+20E, 20E.

As an alternative to LEDs, a full width array of illumination sources can alternately be provided by the use of intermediate shaped plastic light guides splitting or spreading the light from a light source at one edge of the full width illuminator, such as is disclosed in U.S. Pat. No. 6,473,154, the disclosure of which is incorporated by reference in its entirety.

Given a set of 4 or 5 different color LEDs (which include at least one UV LED), in which one of the LEDs is selected at a time, illuminating a 4 or 5 row (4 or 5 colors) image sensor 26, 12 or more different color measurements are available at a time (8 measurements with a 3 row image sensor). The different LEDs 20A, 20B, 20C, 20D, and optionally 20E can be arranged in any convenient repeating pattern which spaces two or more LEDs of a first type (e.g., 20A) by approximately the same distance as for two or more LEDs of a second type (e.g., 20B), and so forth. As noted, the LEDs 20E need not form a part of this sequence.

In the exemplary embodiment, all the LEDs in an array 20 or 22 may be commonly mounted on a single printed circuit board and oppositely oriented at about 45 degrees to the test strip 16 they are both illuminating, as illustrated in FIG. 1. This arrangement allows perpendicular orientation, in between LED arrays 20 and 22, of a linear reflected light optical path from 16 to the image sensor 26 through SELFOC lens 24. However, other arrangements are contemplated. In other embodiments, light guides or lens arrangements may be used to transfer light (or other radiation) from LEDs to the document 14. Moreover, instead of using two LED arrays 20 and 22 as shown, a single LED array may be employed on one side and a reflective mirror on the other side, as is the case with current document scanners using fluorescent illuminators.

Design speed and resolution of the FWA scanning spectrophotometer 10 and its components allow empirical determination of the maximum "on" times available for each of the five sets of LEDs 20A, 20B, 20C, 20D, 20E and also the maximum integration times available for the different rows of photodiodes on the image sensor array 26. Both the LED "on" times and the photodiode row integration times can be adjusted to provide an adequate signal for each of the 8 to 12 or more measurements. The X or transverse direction resolution of the scanning spectrophotometer 12 is controlled by the selected image sensor 26 resolution, which is typically 400 to 600 samples or pixels per inch. The Y or process direction resolution may depend on the document 14 velocity as well as the number of different types of LEDs used.

As for conventional document image scanners, the scanning spectrophotometer system 10 may use pixel level gain and offset calibration. Gain calibration compensates for the spatial variations of the LED illuminators as well as image sensor 26 variations. This may be performed for each type of LED. The offset calibration compensates for the image sensor array and the electronics variations across the entire array. If considerably different integration times are used with different types of LEDs, offset calibration may be repeated for each different type of LED.

Examples of spectral reconstruction algorithms which may be employed are described in the above-mentioned U.S. Pat. Nos. 5,963,244, 6,690,471, and 6,621,576, incorporated by reference. The reconstructed spectral values may then be converted to trichromatic numbers (L*a*b* or XYZ, etc.) for each pixel. The complexity of such an algorithm is typically measured by its computational speed. A DLS algorithm, as referenced in the above-mentioned U.S. Pat. No. 6,975,949, can provide high accuracy provided a good reference database can be constructed. The DLS algorithm can be used with a cellularized database for improving the speed. Algorithms may be implemented in an embedded microprocessor. With an 800 MHz microprocessor each spectral reconstruction may take about 30 ms.

The reference database may be constructed and customized for each scanning spectrophotometer 10, using similar techniques to that of present spectrophotometers. While constructing the reference database an accurate reference spectrophotometer may be used to characterize the exemplary LED scanning spectrophotometer.

As will be appreciated, the spectral measurements obtained by such a FWA scanning spectrophotometer can be used for better diagnostics and control of colors from one or more color print engines. Examples include: 1) output engine page non-uniformity measurements and their correction; 2) spatial gray balance with fine quantization for half tone array (smoother tone degradation, improved resolution in tone development, contour free calibration), as described in U.S. Pat. No. 7,277,196, by Van de Capelle, et al., entitled ITERATIVE PRINTER CONTROL AND COLOR BALANCING SYSTEM AND METHOD USING A HIGH QUANTIZATION RESOLUTION HALFTONE ARRAY TO ACHIEVE IMPROVED IMAGE QUALITY WITH REDUCED PROCESSING OVERHEAD, the disclosure of which is incorporated herein in its entirety by reference; 4) remote soft proofing of device and media independent images. Other applications or the spectrophotometer system 10 are described in U.S. Pat. No. 6,975,949, incorporated by reference.

Figure 3:
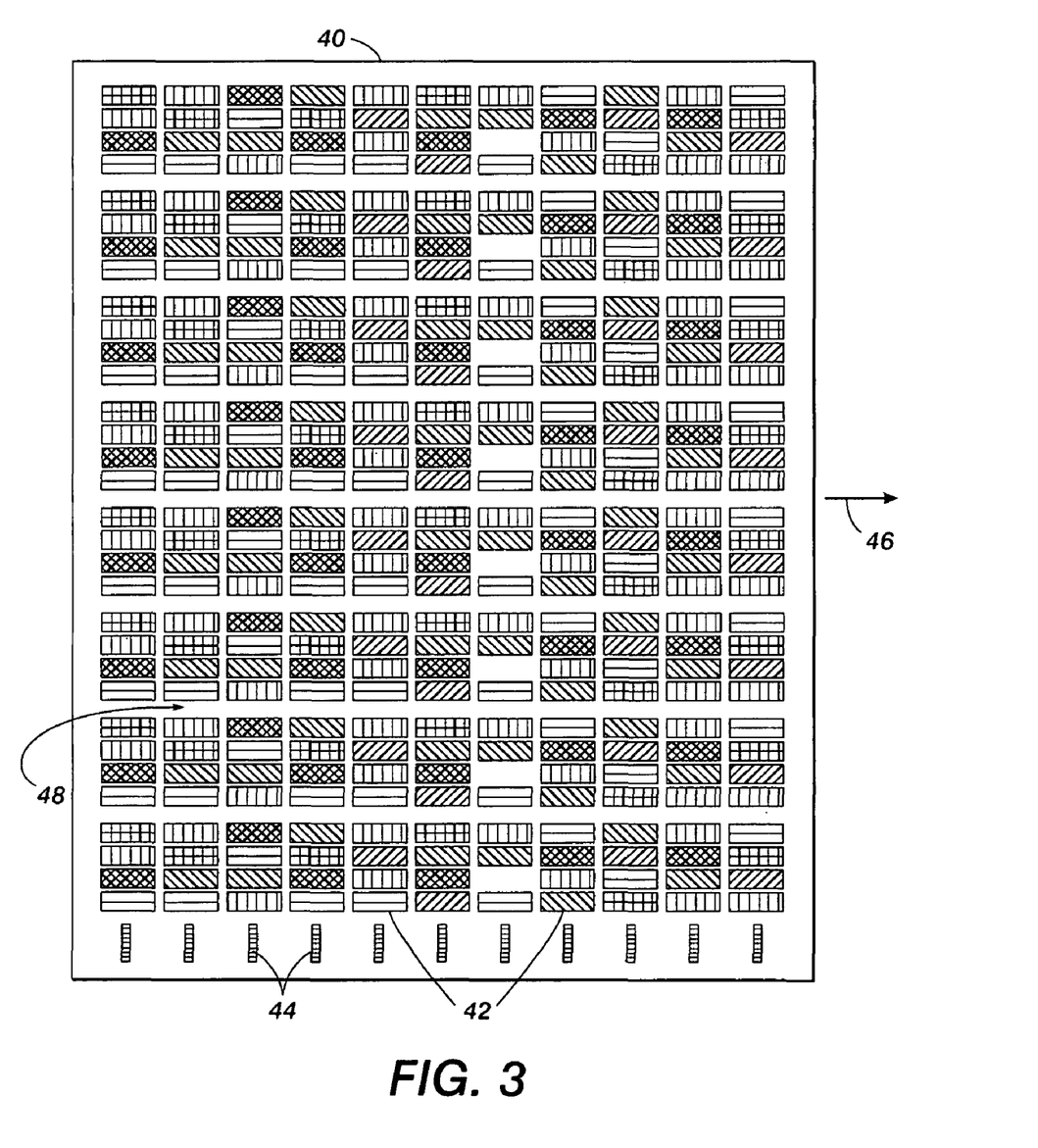
FIG. 3 is one example of a printed test sheet with multiple different colors of test patches that could be used with the full width scanning spectrophotometer of FIGS. 1 and 2.

FIG. 3 is illustrates an exemplary example of a color printer test target 40 which may be employed to generate a printed sheet 14 with rows of different color test patches 42 and timing or triggering indicia marks 44. As described, and shown in FIG. 1, the sheet 14 printed as a full width test target 40 may be moved in the direction of arrow 46 relative to the FWA spectrophotometer 12, or vice versa.

In an exemplary embodiment, which employs at least one UV-emitting LED, the sensor system 10 may be employed with objects, such as fluorescent paper. In this embodiment, the image sensor 26 may include one or more UV-detecting detectors, i.e., detectors capable of detecting in the UV-range of the spectrum. By adding one or more LEDs with peak emission wavelength of 360 to 370 nm and using similar spectral reconstruction methods, the sensor system can be enhanced to cover the UV range for use in color printing and other related measurement applications. Additionally, the test sheet may be configured such that one or more inter-patch or peripheral blank spaces 48 are aligned with the UV-emitting LEDs 20E so that the unprinted portion of the sheet may serve as a test patch for assessing the fluorescence of the paper.

UV LEDs 20E are available in various forms and sizes. While a 405 nm die could be employed as a UV LED, other UV LEDs which may be suitably employed have a peak wavelength of around 360 nm.

In one embodiment, the UV portion of the spectrum (from about 200 nm to about 400 nm), alone or in combination with the visible portion of the spectrum, may be used to identify the material composition of a print media substrate such as paper, or other object under investigation. This is a form of non-contact, non-reactive chemical analysis which can be used to analyze the compounds present.

Databases for spectral reconstruction may be constructed by characterizing the UV Enhanced FWA spectrophotometer 12 with a reference spectrophotometer. For example, a sheet 14 printed by the color output device 30 having a set of color test patches printed thereon is first analyzed in-line with the UV-enhanced spectrophotometer system 10. The sheet 14 is also analyzed by a reference spectrometer (not shown), which may be the same type of spectrometer as the inline spectrometer or a different one, e.g., an off-line sensor. A database of measurements from the two spectrometers is obtained and a mapping between the two performed to allow subsequent measurements on the in-line spectrophotometer to be corrected, based on the mapping.

In one embodiment, the exemplary spectrophotometer 12 may be incorporated into a thermochromaticity correction system 34 of the type described in one or more of above-mentioned copending Application Ser. No. 61/056,090, entitled METHOD FOR CONDITIONAL APPLICATION OF COLOR MEASUREMENT ERROR COMPENSATION IN SPECTRAL SENSORS, filed on May 27, 2008, copending Application Ser. No. 61/056,095, entitled METHOD TO MINIMIZE INSTRUMENT DIFFERENCES IN COLOR MANAGEMENT FUNCTIONS, filed on May 27, 2008, and application Ser. No. 11/737,576, filed Apr. 19, 2007, entitled METHOD AND SYSTEM FOR COMPENSATING FOR THERMOCHROMATICITY DIFFERENCES IN INLINE SPECTROPHOTOMETERS, all by Mestha, et al., the disclosures of which are incorporated herein in their entireties by reference. In such a system, the measurements output by the in-line spectrophotometer are corrected to account for temperature differences between the in-line spectrophotometer and the second spectrophotometer, which may be the same or a different type of spectrophotometer.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A full width array spectrophotometer system for full width scanning color analysis of a printed media sheet, comprising:
   an elongated illumination array of closely spaced illumination sources, comprising:
      a first set of illumination sources of different colors in the visible range, and
      a second set of UV-emitting illumination sources comprising at least one UV-emitting illumination source;
   the sets arranged so as to extend sufficiently in a substantially linear dimension to transversely substantially span a printer paper path to illuminate, with the illumination sources of different colors in the visible range and the UV-emitting illumination source, a transverse illuminated band extending transversely across a printed print media sheet moving in the paper path; and
   a full width array radiation sensor comprising an elongated array of multiple closely spaced photodetectors for detecting plural colors adjacent to and extending substantially parallel to the at least one substantially linear array of closely spaced multiple illumination sources, the full width array radiation sensor being positioned to receive radiation reflected from the transverse illuminated band extending transversely across the print media sheet moving in the paper path.

2. The full width array spectrophotometer system of claim 1, wherein the illumination sources comprise LEDs.

3. The full width array spectrophotometer system of claim 1, wherein the illumination sources in the first set of illumination sources of different colors are sequentially illuminated.

4. The full width array spectrophotometer system of claim 1, wherein the at least one UV-emitting illumination source is illuminated contemporaneously with one of the first set of illumination sources of different colors.

5. The full width array spectrophotometer system of claim 1, wherein the second set of UV-emitting illumination sources comprises at least one UV-emitting illumination source with a first emission spectrum which has a first peak wavelength and at least a second UV-emitting illumination source with a second emission spectrum, different form the first emission spectrum, which has a second peak wavelength.

6. The full width array spectrophotometer system of claim 1, wherein the illumination sources are arranged so as to repeat the plurality of illumination sources of different colors in the visible range and the UV-emitting light source several times over the length of the array.

7. The full width array spectrophotometer system of claim 1, wherein the plurality of illumination sources of different colors in the visible range comprise at least three different colors.

8. The full width array spectrophotometer system of claim 1, wherein a substantial portion of the radiation emitted by the UV-emitting illumination source is in the UV range of the spectrum.

9. The full width array spectrophotometer system of claim 1, wherein the UV-emitting illumination source has a peak emission wavelength of up to 410 nm.

10. The full width array spectrophotometer system of claim 9, wherein the UV-emitting illumination source has a peak emission wavelength of less than 400 nm.

11. The full width array spectrophotometer system of claim 9, wherein the UV-emitting illumination source has a peak emission wavelength of about 360-370 nm.

12. The full width array spectrophotometer system of claim 1, wherein each first set of illumination sources comprises a first illumination source having a first peak wavelength in the visible spectrum and a second set of illumination sources having a second peak wavelength in the visible spectrum, spaced from the first peak wavelength by at least 50 nm.

13. The full width array spectrophotometer system of claim 1, wherein the array of multiple closely spaced photodetectors comprises only visible light detecting photodetectors which each detect reflected light only in a visible range of the electromagnetic spectrum.

14. The full width array spectrophotometer system of claim 1, wherein the at least one UV-emitting illumination source emits radiation outside a detection wavelength range of the array of multiple closely spaced photodetectors.

15. The full width array spectrophotometer system of claim 1, wherein the first and second sets are arranged in a repeat pattern.

16. The full width array spectrophotometer of claim 1, wherein the at least one substantially linear elongated illumination array comprises a plurality of substantially linear elongated illumination arrays.

17. The full width array spectrophotometer system of claim 1, wherein the substantially linear elongated illumination array comprises at least one infra-red emitting illumination source.

18. A printer comprising the full width array spectrophotometer system of claim 1, wherein the elongated illumination array and the full width array radiation sensor are embedded in an output path of a color output device which prints the media sheet.

19. A method for full width scanning color analysis of a printed media sheet, comprising:
   illuminating a printed media sheet with a plurality of illumination sources arranged in at least one substantially linear elongated illumination array of closely spaced multiple illumination sources, the array of comprising a first set of illumination sources of different colors in the visible range and a second set of UV-emitting illumination sources comprising at least one UV-emitting illumination source, the sets arranged so as to extend sufficiently in the substantially linear dimension to transversely substantially span a printer paper path to illuminate, with the illumination sources of different colors in the visible range and the UV-emitting illumination source, a transverse illuminated band extending transversely across a printed print media sheet moving in the paper path; and
   measuring reflected electromagnetic radiation with a full width array sensor comprising an elongated array of multiple closely spaced photodetectors for detecting plural colors adjacent to and extending substantially parallel to the at least one substantially linear array of closely spaced multiple illumination sources, the full width array sensor being positioned to receive radiation reflected from the transverse illuminated band extending transversely across the print media sheet moving in the paper path.

20. The method of claim 19, further comprising:
   compensating the measured reflected radiation of plural colors for an effect of a difference in temperature on the measured reflected radiation between a temperature of the measurements and ambient temperature.

21. The method of claim 19, further comprising, using the measured reflectances as a basis for assessing operability of a color output device which printed the printed media sheet.

22. The method of claim 19, wherein the media sheet is selected from the group consisting of paper, plastic cloth, metal, semiconductor materials, and combinations thereof.

23. In combination, an output device and a full width array spectrophotometer comprising:
   an output device storing information for generating a printed media sheet comprising rows of different color test patches and at least one space absent test patches; and
   a full width array spectrophotometer comprising an elongated array of illumination sources positioned to illuminate the generated sheet including:
      a plurality of first illumination sources, each first illumination source having a peak emission wavelength in a visible region of the electromagnetic spectrum, and
      at least one second illumination source, each second illumination source having a peak emission wavelength outside the visible portion of the electromagnetic spectrum, at least one of the at least one second illumination sources being positioned to illuminate the at least one space; and
   a light imaging sensor comprising an elongated array of multiple closely spaced photodetectors for detecting plural colors adjacent to and extending substantially parallel to the array of illumination sources, the light imaging sensor being positioned to receive light reflected from the printed media sheet, including light reflected from the at least one space illuminated by the at least one second illumination source.

* * * * *